United States Patent
Wong et al.

(10) Patent No.: US 7,522,598 B2
(45) Date of Patent: Apr. 21, 2009

(54) SYSTEM AND METHOD OF PROTECTING AN IGMP PROXY

(75) Inventors: Allen Tsz-Chiu Wong, San Jose, CA (US); Zhidan Cheng, Sunnyvale, CA (US)

(73) Assignee: Tellabs Petaluma, Inc., Petaluma, CA (US)

( * ) Notice: Subject to any disclaimer, the term of this patent is extended or adjusted under 35 U.S.C. 154(b) by 729 days.

(21) Appl. No.: 10/996,845

(22) Filed: Nov. 23, 2004

(65) Prior Publication Data

US 2006/0153219 A1    Jul. 13, 2006

(51) Int. Cl.
*H04L 12/28* (2006.01)
*H04J 3/26* (2006.01)

(52) U.S. Cl. ..................... 370/390; 370/432
(58) Field of Classification Search ......... 370/216–221, 370/312, 390, 432
See application file for complete search history.

(56) References Cited

U.S. PATENT DOCUMENTS

| | | | |
|---|---|---|---|
| 6,392,990 B1* | 5/2002 | Tosey et al. | 370/218 |
| 6,587,943 B1* | 7/2003 | Hardjono | 713/163 |
| 6,751,747 B2* | 6/2004 | Li | 714/4 |
| 2003/0067917 A1* | 4/2003 | Morrison et al. | 370/390 |
| 2003/0233540 A1* | 12/2003 | Banerjee et al. | 713/153 |
| 2005/0091396 A1* | 4/2005 | Nilakantan et al. | 709/232 |

* cited by examiner

*Primary Examiner*—Hong Cho
(74) *Attorney, Agent, or Firm*—Mark C. Pickering (57) ABSTRACT

An Internet Group Multicast Protocol (IGMP) proxy provides network redundancy to prevent a severed or damaged line, or a malfunctioning router interface from denying services to the IGMP proxy by outputting the multicast group addresses that are received by the IGMP proxy to a first multicast interface that is electrically connected to a first router interface of a router, and to a second multicast interface that is electrically connected to a second router interface of the router.

22 Claims, 5 Drawing Sheets

SYSTEM AND METHOD OF PROTECTING AN IGMP PROXY

BACKGROUND OF THE INVENTION

1. Field of the Invention

The present invention relates to an IGMP proxy and, more particularly, to a system and method of protecting an IGMP proxy.

2. Description of the Related Art

An Internet Group Multicast Protocol (IGMP) proxy is a router that is connected between a number of hosts and a multicast router in a communications network. In operation, the IGMP proxy interacts with the hosts, which are connected to a downstream side of the proxy, like a multicast router. At the same time, the IGMP proxy interacts with the multicast router, which is connected to an upstream side of the proxy, like a host.

Figure 1:
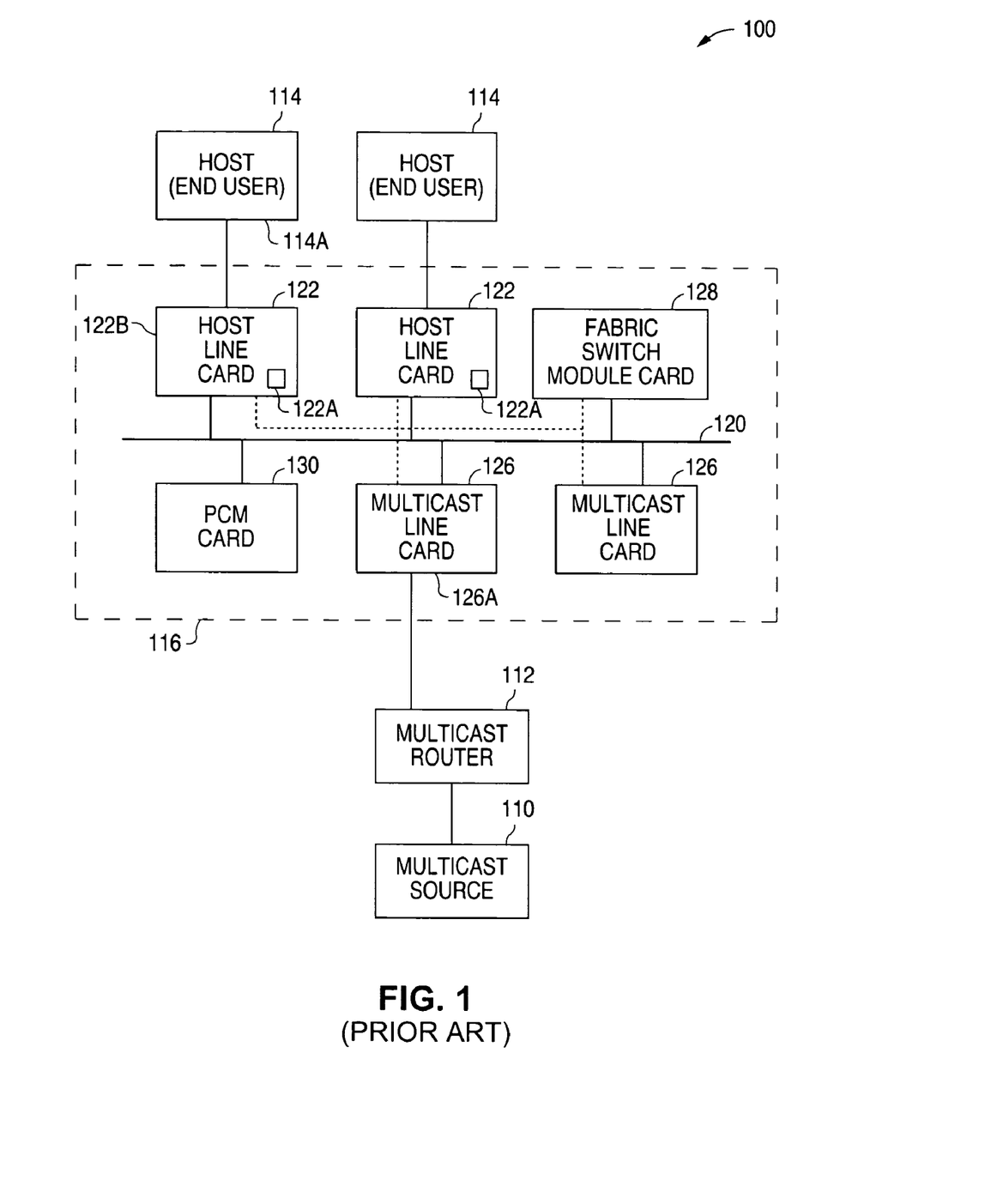
FIG. 1 is a block diagram illustrating a prior-art communications network 100.

FIG. 1 shows a block diagram that illustrates a prior-art communications network 100. As shown in FIG. 1, network 100 includes a multicast source 110 and a multicast router 112 that is connected to multicast source 110. Multicast source 110 outputs streams of multicast data packets to router 112. Each multicast data packet, in turn, has an associated multicast group address.

For example, multicast source 110 can be implemented with a video head end, and the multicast data packets can represent television channels that are identified by the multicast group addresses. For example, a multicast data packet of television channel 1 can have a first multicast group address, while a multicast data packet of television channel 2 can have a second multicast group address.

Multicast router 112, in turn, includes a router input that receives the multicast data packets from multicast source 110, a number of router output interfaces, and a memory that stores a forwarding table that identifies which television channels (multicast group addresses) are forwarded to each router output interface.

In addition, communications network 100 includes a number of hosts 114, and an IGMP proxy 116 which has an upstream side that is connected to multicast router 112, and a downstream side that is connected to the hosts 114. The hosts 114 can be, for example, end users.

As further shown in FIG. 1, IGMP proxy 116 includes a control bus 120 and a number of host line cards 122 that are connected to a number of hosts 114 and control bus 120. Control bus 120, which passes only non-packet control messages, can be implemented with, for example, a low-speed, Ethernet-type bus.

The host line cards 122, in turn, can be implemented with, for example, xDSL line cards. Each host line card 122 includes a logic block 122A that has logic circuitry and a memory that stores a host table. The host table indicates the television channel that is received by each host (e.g., end user) 114 that is connected to host line card 122. In the FIG. 1 example, the host table of a host line card 122B indicates the television channels to be received by a host (end user) 114A.

In addition, IGMP proxy 116 further includes a number of multicast line cards 126 that are connected to control bus 120, and a number of forwarding units, such as routers, to receive multicast data packets. Each multicast line card 126 has a memory that includes a forwarding table. The forwarding table includes the multicast group addresses of the television channels that are received by the card, and the host line cards 122 that are to receive the television channels.

As shown in the FIG. 1 example, a multicast line card 126A is connected to multicast router 112. Multicast line card 126A receives control and data information from multicast router 112, and outputs control information to multicast router 112. Multicast line card 126A has a forwarding table that includes the multicast group addresses of the television channels that are received by card 126A, and the host line cards 122 that are to receive the television channels from card 126A.

In addition, IGMP proxy 116 additionally includes a fabric switch module card 128 that is connected to control bus 120, and between the host line cards 122 and the multicast line cards 126. Fabric switch module card 128 passes data packets between the line cards at up to OC12 speeds.

Further, IGMP proxy 116 can also include a primary control module (PCM) card 130 that is connected to control bus 120. PCM card 130 includes a memory and a processor that is connected to the memory. The memory includes a first PCM table that has the multicast group addresses of the television channels that are received by the host line cards 122. The memory also includes a second PCM table that has the multicast group addresses of the television channels that are received by the multicast line cards 126.

The memory can also store an operating system and a set of program instructions. The operating system can be implemented with, for example, the Linux operating system, although other operating systems can alternately be used. The program instructions can be written in, for example, C++ although other languages can alternately be used.

The processor, which can be implemented with, for example, a 32-bit processor, operates on the data in the first and second PCM tables in response to the program instructions. Although only one processor is described, multiple processors in parallel can also be utilized to increase the capacity to process large amounts of data. (PCM card 130 also includes circuitry for inserting information into the memory, and removing information from the memory.)

In operation, network 100 supports IGMP Version 1 (RFC 1112) and Version 2 (RFC 2236) such that multicast router 112 executes the router protocol, and the hosts 114 execute the host protocol. Further, the host line cards 122, the multicast line cards 126, and PCM card 130 of IGMP proxy 116 execute both the router protocol and the host protocol.

For example, assume that multicast source 110 outputs multicast data packets with N permanent multicast group addresses that represent N television channels. In this example, multicast router 112 receives the N television channels, and forwards the television channels to the hosts (proxies) which are connected to the router output interfaces in accordance with the forwarding table, which identifies the multicast group addresses of the television channels that are forwarded to each router output interface.

The forwarding table identifies all of the multicast groups that can be forwarded from the router output interfaces. Thus, before multicast router 112 can forward a television channel to a host (proxy) that is connected to a router output interface, multicast router 112 must first associate the multicast group address of the television channel with the router output interface in the router forwarding table.

Thus, when the forwarding table includes N television channels, and the router output interface connected to IGMP proxy 116 is associated with each television channel, multicast router 112 forwards all N channels to IGMP proxy 116. As a result, in the present example, multicast router 112 forwards all N television channels to multicast line card 126A of IGMP proxy 116.

When the multicast line cards 126 receive multicast data packets, the multicast line cards 126 forward the multicast data packets to the host line cards 122 as indicated in the forwarding tables on the multicast line cards 126. For example, when multicast line card 126A receives channel 2, multicast line card 126A forwards channel 2 to host line card 122A when host line card 122A is associated with channel 2 in the forwarding table on multicast line card 126A.

In the present example, when a host (end user) 114 wishes to join a group (receive a television channel), the host (end user) 114 outputs an unsolicited version two (V2) membership report which, among other things, identifies the multicast group address of the group (television channel) that the host (end user) 114 wishes to receive.

For example, when host (end user) 114A wishes to receive television channel 2, host (end user) 114A outputs an unsolicited V2 membership report to host line card 122A (which host (end user) 114A sees as a multicast router) that identifies the multicast group address of channel 2.

When a host line card 122 receives an unsolicited V2 membership report, the host line card 122 sends a non-packet control message to PCM card 130. When the multicast group address of the television channel identified in the unsolicited V2 membership report is not received by the host line card 122, but is listed in the second PCM table as currently received by a multicast line card 126, PCM card 130 sends a non-packet control message to the multicast line card 126. The control message instructs the multicast line card 126 to add the host line card 122 to the forwarding table to receive the television channel.

For example, when channel 2 is not received by host line card 122A, but the second PCM table indicates that multicast line card 126A is currently receiving television channel 2, PCM card 130 sends a control message to multicast line card 126A via control bus 120 to associate host line card 122A in the forwarding table to allow multicast line card 126A to forward channel 2 to host line card 122A.

On the other hand, when the multicast group address of the television channel is not currently received by a multicast line card 126, IMGP proxy 116 must act as a host, and thereby generate an unsolicited V2 membership report which identifies the multicast group address of the group (television channel), and transmit the unsolicited V2 membership report to multicast router 112.

In the present example, when the second PCM table indicates that no multicast line card 126 is receiving channel 2, PCM card 130 outputs join information to multicast line card 126A which, in turn, generates the unsolicited V2 membership report to be forwarded to multicast router 112.

When multicast router 112 receives an unsolicited V2 membership report at a router output interface, multicast router 112 associates the multicast group address of the group (television channel) from the unsolicited V2 membership report with the router output interface in the forwarding table when the multicast group address is not currently associated with the interface.

For example, when multicast router 112 receives an unsolicited V2 membership report that identifies channel 2, and channel 2 is not currently associated with the router output interface in the forwarding table, multicast router 112 associates the multicast group address of channel 2 with the router output interface in the forwarding table.

When a host (end user) 114 wishes to no longer receive a multicast data packet (television channel), the host (end user) 114 outputs a leave message to the associated host line card 122. When a host line card 122 receives a leave message, the host line card 122 sends a non-packet control message to PCM card 130.

When the leave message is from the last host (end user) 114 of the last host line card 122 to leave the group (stop receiving the channel), PCM card 130 removes the multicast group address of the group (the television channel) from the first PCM table, which includes the multicast group addresses that are received by the host line card 122.

For example, when host line card 122A receives from host (end users) 114A a leave message which identifies the multicast group address of channel 9, host (end user) 114A is the last host (end user) 114A to leave channel 9, and host line card 122A is the last host line card 122 to leave channel 9, PCM card 130 removes the multicast group address of channel 9 from the first PCM table. (PCM card 130 subsequently removes the multicast group address of the group (the television channel) from the second PCM table, which includes the multicast group addresses that are received by the multicast line cards 126.)

In addition, PCM card 130 sends a control message to the multicast line card 126 that is currently receiving the television channel (with the multicast group address). The control message instructs the multicast line card 126 to remove the host line card 122 from the forwarding table so that the host line card 122 no longer receives the television channel.

For example, when multicast line card 126A is currently receiving television channel 9, PCM card 130 sends a non-packet control message to multicast line card 126A to remove host line card 122A from the forwarding table to prevent multicast line card 126A from forwarding channel 9 to host line card 122A.

In addition, since no other host line card 122 receives the group (television channel), IMGP proxy 116 must act as a host, and thereby generate a leave message which identifies the multicast group address of the group (television channel), and transmit the leave message to multicast router 112.

In the present example, when the first PCM table indicates that none of the other host line cards 122 receives channel 9, PCM card 130 outputs leave information to multicast line card 126. In response, PCM card 130 generates a leave message that is forwarded to multicast router 112.

When multicast router 112 receives a leave message from a host (proxy) 116, and the leave message is from the last host (proxy) 116 connected to the router output interface to leave the group (television channel), multicast router 112 de-associates the multicast group address of the group (television channel) from the router output interface in the forwarding table on multicast router 112.

In addition to the above, multicast router 112 and PCM card 130 both periodically query the attached hosts to insure that the hosts are still receiving the multicast data packets. For example, PCM card 130 runs a general query timer that measures a query interval. When the query timer expires, indicating that the query interval has ended, PCM card 130 outputs a general query to a host line card 122 which is forwarded to each host (end user) that is connected to the host line card 122. The general query includes a maximum response time. In addition to outputting the general query, PCM card 130 also starts a response timer that measures the maximum response time.

In response to a general query, a host (end user) 114 outputs a V2 membership report that indicates the multicast group address of the group (television channel) which is currently received by the host (end user) 114. For example, when connected to channel 7, host (end user) 114A responds to a general query by outputting a V2 membership report that includes the multicast group address of channel 7.

After PCM card 130 receives the V2 membership reports from the hosts (end users) 114, PCM card 130 updates the first PCM table, which includes the multicast group addresses for the host line card 122, and again starts the general query timer to measure the next query interval. On the other hand, when the response timer expires, PCM card 130 removes the multicast group addresses that were in the first PCM table, but were not updated by a V2 membership report.

For example, when host (end user) 114A, which was the only, host (end user) 114 connected to receive television channel 7, is turned off, the response timer expires without PCM card 130 receiving a V2 membership report that identifies the multicast group address of channel 7. As a result, PCM card 130 removes the multicast group address of channel 7 from the first PCM table. In addition, PCM card 130 outputs a control message to the multicast line card 126 that is receiving channel 7 to remove host line card 122A from its forwarding table.

Similarly, multicast router 112 runs a general query timer that measures a query interval. When the query timer expires, indicating that the query interval has ended, multicast router 112 outputs a general query to the hosts (proxies) 116 that are connected to a router output interface. The general query includes a maximum response time. In addition to outputting the general query, multicast router 112 also starts a response timer that measures the maximum response time.

In response to a general query, a host (proxy) outputs a membership report that indicates the multicast group addresses of the groups (television channels) which are currently received by the multicast line card 126 of the host (proxy). In the present example, host (proxy) 116 responds to a general query by outputting a membership report that includes all of the multicast group addresses received by multicast line card 126A of host (proxy) 116.

After multicast router 112 receives the membership report from the hosts (proxies) 116, multicast router 112 updates the forwarding table of multicast group addresses for the router output interface, and again starts the general query timer to measure the next query interval. On the other hand, when the response timer expires, multicast router 112 removes the multicast group addresses that were in the table, but were not updated by a membership report.

For example, when host (proxy) 116, which is the last member to receive television channel 7, fails to include channel 7 in the response to the query and the response timer expires, multicast router 112 removes the multicast group address of channel 7 from the from the forwarding table for the router output interface.

In addition to general queries, multicast router 112 and PCM card 130 can output group specific queries to the hosts (proxies) 116 that are connected to a router output interface, and the hosts (end users) 114 that are connected to a host line card 122, respectively, to determine if any host is connected to a group (television channel).

SUMMARY OF THE INVENTION

The present invention provides a method of operating a communications network. The method includes the step of receiving first membership information from a host via a host interface of a plurality of electrically-connected host and multicast interfaces. The first membership information identifies a multicast group address of a group.

The method also includes the step of determining if the group having the multicast group address is output to another host interface of the plurality of electrically-connected host and multicast interfaces. When the group having the multicast group address is not output to another host interface of the plurality of electrically-connected host and multicast interfaces, the method includes the step of generating second membership information that identifies the multicast group address of the group. Further; the method includes the step of outputting the second membership information to a first multicast interface.

The present invention also includes a method of operating a communications network that includes the step of receiving multicast information from a source. The multicast information from the source has a plurality of multicast group addresses. The method also includes the step of determining if the multicast information from the source is control information or data information. The method further includes the step of generating and outputting a control message in response to control information.

The present invention additionally includes a method of detecting a link condition between a forwarding unit and an interface, where the forwarding unit outputs a plurality of packets to the interface. The method includes the steps of moving from a first state to a second state when a packet is received, and when a packet has not been received for a period of time, moving from the second state to a third state and outputting a ping to the forwarding unit. Further, when a response to the ping has not been received for a predefined time, the method moves to a fourth state to output a link down signal.

The present invention further includes a communications network that includes a multicast router that outputs multicast data packets with one or more multicast group addresses. The multicast router has a plurality of output interfaces, and a memory that stores a forwarding table of multicast group addresses for each output interface.

The network also includes a plurality of hosts, and a proxy which has an upstream side that is connected to the multicast router, and a downstream side that is connected to the hosts. The proxy has a bus, and a plurality of host line cards that are connected to the hosts and the bus.

In addition, the proxy has a number of multicast line cards that are connected to the bus, where a first multicast line card is connected to the multicast router. Further, the proxy includes a primary control module (PCM) card that is connected to the bus. The PCM card includes a memory that stores a table of multicast group addresses received by the multicast line cards.

A better understanding of the features and advantages of the present invention will be obtained by reference to the following detailed description and accompanying drawings that set forth an illustrative embodiment in which the principles of the invention are utilized.

DETAILED DESCRIPTION OF THE INVENTION

Figure 2:
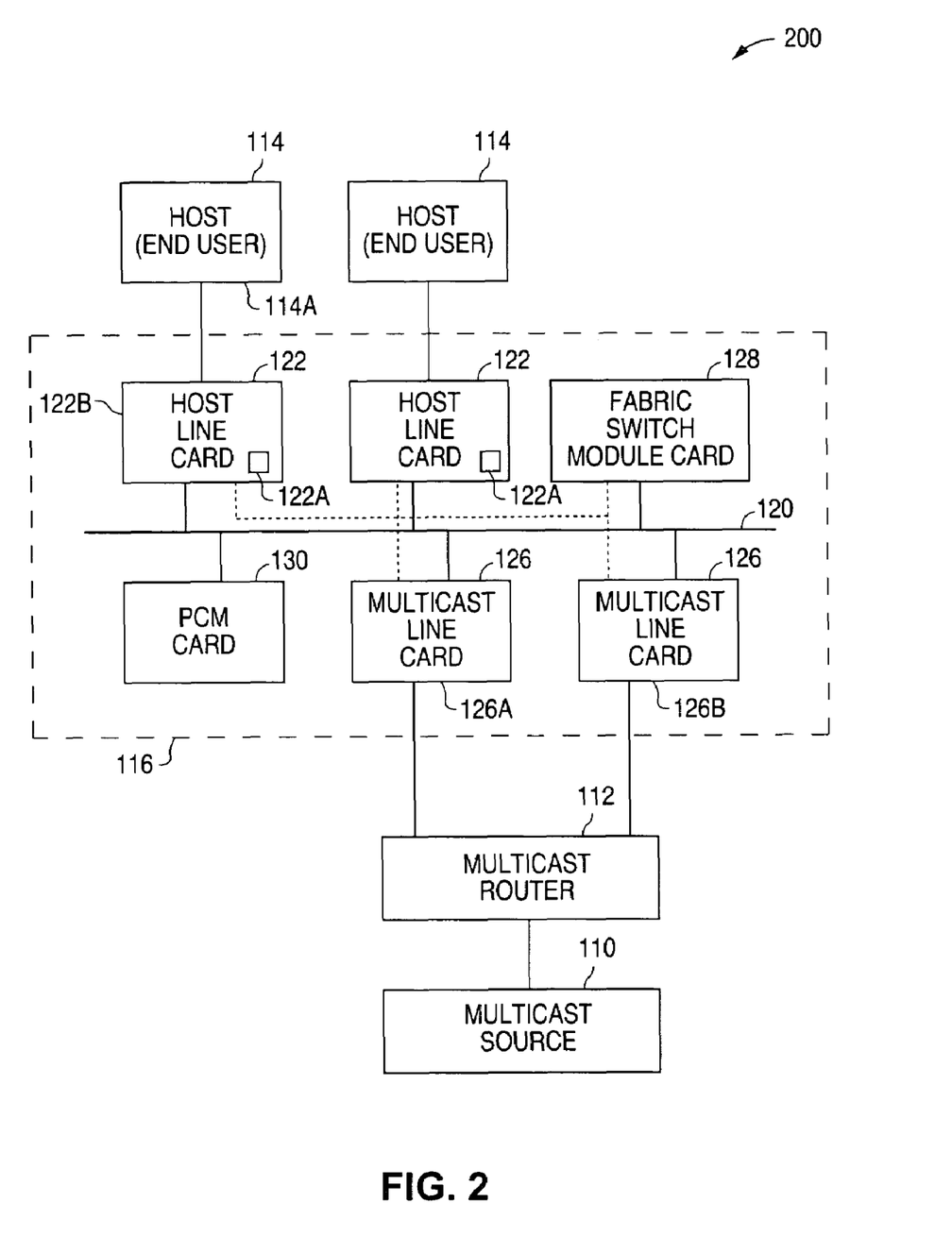
FIG. 2 is a block diagram illustrating an example of a communications network 200 in accordance with the present invention.

FIG. 2 shows a block diagram that illustrates an example of a communications network 200 in accordance with the present invention. As described in greater detail below, network 200 provides network redundancy that prevents a severed or damaged line, or a malfunctioning router output interface from denying services to an IGMP proxy.

Network 200 is similar to network 100 and, as a result, utilizes the same reference numerals that are common to both networks. As shown in FIG. 2, network 200 differs from network 100 in that network 200 has two multicast line cards, 126A and 126B, that are connected to two separate interfaces of the same router, multicast router 112.

Multicast line cards 126A and 126B are identical except that cards 126A and 126B have different addresses on control bus 120, and different connections to fabric switch module card 128. In addition, as described in greater detail below, one card is designated to be the primary connection, while the other card is designated to be the backup connection.

Figure 3:
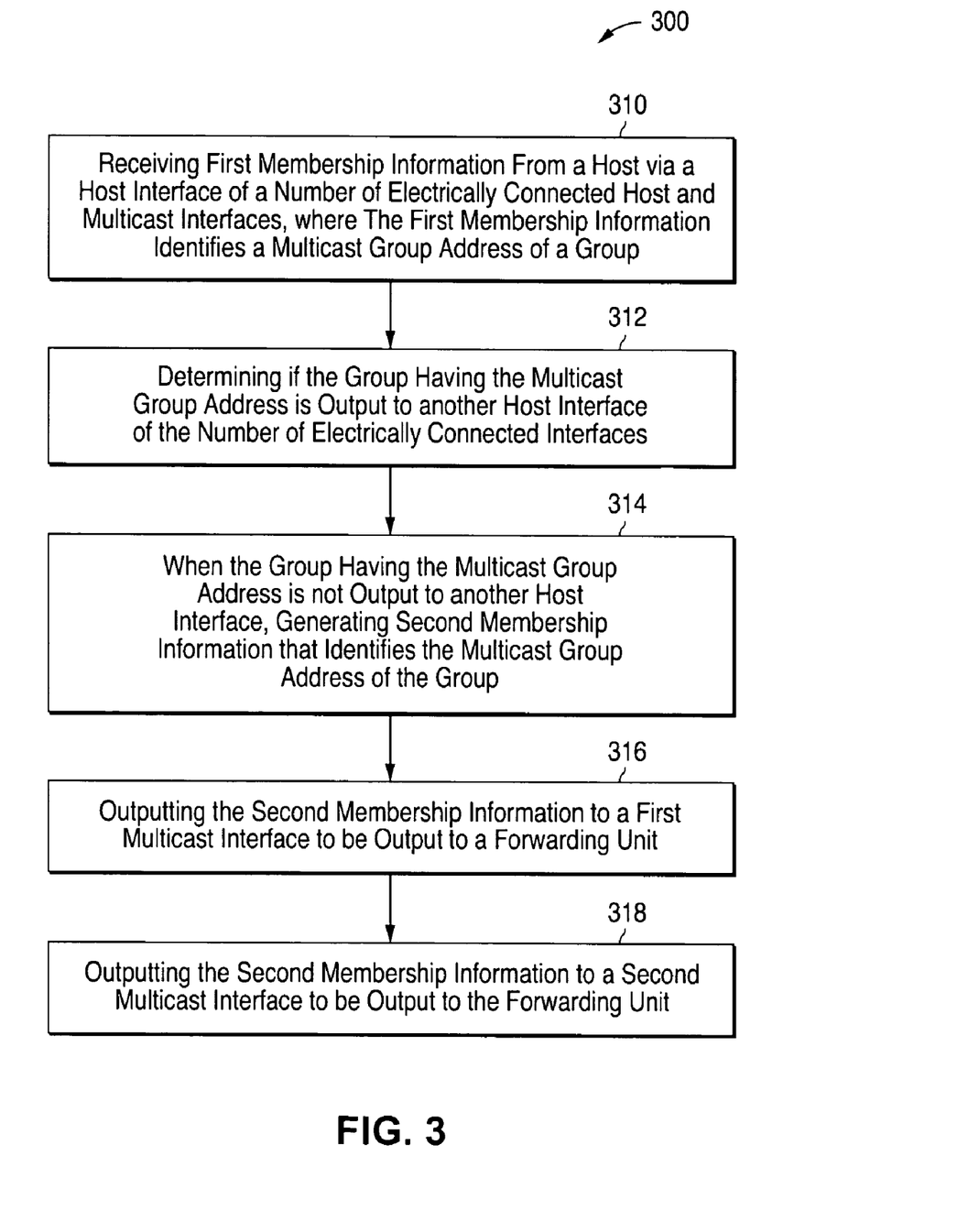
FIG. 3 is a flow chart illustrating an example of a method 300 of operating PCM card 130 of IGMP proxy 116 in accordance with the present invention.

FIG. 3 shows a flow chart that illustrates an example of a method 300 of operating PCM card 130 of IGMP proxy 116 in accordance with the present invention. As shown in FIG. 3, method 300 begins at step 310 by receiving first membership information from a host (end user), such as host (end user) 114A, via a host interface, such as host line card 122A, which is one of a number of electrically-connected host and multicast interfaces (via control bus 120).

The first membership information can include join information that identifies the multicast group address of a group (television channel) to be joined. For example, PCM card 130 can receive join information that includes the multicast group address of television channel 4 when host (end user) 114A wishes to receive channel 4. The join information received by PCM card 130 can be extracted from an unsolicited V2 membership report that was generated by host (end user) 114A and received by host line card 122A.

In addition, the first membership information can include leave information that identifies the multicast group address of a group (television channel) to be left. For example, PCM card 130 can receive leave information that includes the multicast group address of television channel 4 when host (end user) 114A wishes to leave channel 4. The leave information received by PCM card 130 can be extracted from a leave message that was generated by host (end user) 114A and received by host line card 122A.

When the first membership information is received, method 300 moves to step 312 to determine if the group (television channel) having the multicast group address identified in the first membership information is currently output to another host interface. For example, PCM 130 can determine if television channel 4 is currently output to another host line card 122.

When the group (television channel) having the multicast group address identified in the first membership information is not output to another host interface (host line card 122), method 300 moves to step 314 to generate second membership information that includes the multicast group address of the group (television channel).

The second membership information can include join information that identifies the multicast group address of the group (television channel) to be joined. For example, PCM card 130 can generate join information that includes the multicast group address of television channel 4 when channel 4 is to be joined.

The second membership information can also include leave information that identifies the multicast group address of the group (television channel) to be left. For example, PCM card 130 can generate leave information that includes the multicast group address of television channel 4 when channel 4 is to be left.

After the second membership information has been generated, method 300 moves to step 316 to output the second membership information to a first multicast interface to be output to a forwarding unit, such as a router. Following this, in accordance with the present invention, method 300 moves to step 318 to output the same second membership information to a second multicast interface to be output to the same forwarding unit (directly or indirectly).

The first multicast interface (e.g., multicast line card 126A) generates a control message in response to the second membership information, and outputs the control message to a forwarding unit. For example, when the control message is a join message, the first multicast interface generates an unsolicited V2 membership report from the second membership information, and outputs the unsolicited V2 membership report to the forwarding unit. When the control message is a leave message, the first multicast interface generates the leave message from the second membership information, and outputs the leave message to the forwarding unit.

The second multicast interface (e.g., multicast line card 126B) also generates a control message in response to the second membership information, and outputs the control message the forwarding unit. For example, when the control message is a join message, the second multicast interface generates an unsolicited V2 membership report from the second membership information, and outputs the unsolicited V2 membership report to the forwarding unit. When the control message is a leave message, the second multicast interface generates the leave message from the second membership information, and outputs the leave message to the forwarding unit.

In addition, a first interface of the forwarding unit is connected to receive the control message (e.g., unsolicited V2 membership report or leave message) output by the first multicast interface, while a second interface of the forwarding unit is electrically (not necessarily directly) connected to receive the control message (e.g., unsolicited V2 membership report or leave message) output by the second multicast interface.

For example, PCM card 130 can command both of the multicast line cards 126A and 126B to output the unsolicited V2 membership report or the leave message to multicast router 112. In addition, multicast router 112 can have two independent router interfaces, one of which is connected to multicast line card 126A and one of which is connected to multicast line card 126B.

For example, when a join request for television channel 4 is received and television channel 4 is not output to another host line card 122, PCM card 130 can output second membership information to multicast-line cards 126A and 126B which is sufficient for both cards to generate and output unsolicited V2 membership reports to router 112 that identify the multicast group address of channel 4.

On the other hand, when a leave request for television channel 4 is received and television channel 4 is not output to another host line card 122, PCM card 130 can output second membership information to multicast line cards 126A and 126B which is sufficient for both cards to generate and output leave messages to router 112 that identify the multicast group address of channel 4.

When multicast router 112 receives an unsolicited V2 membership report from a host (proxy) 116 on a router output interface, and the report includes a multicast group address for a group (television channel) that is not currently in the forwarding table for the router output interface, multicast router 112 associates the multicast group address of the group (television channel) with the router output interface in the forwarding table.

For example, when multicast router 112 receives an unsolicited V2 membership report from multicast line card 126A (on the first router interface) that identifies the multicast group address of channel 4, multicast router 112 associates the multicast group address of channel 4 with the first router interface in the forwarding table when the multicast group address of channel 4 is not associated with the first router interface.

In addition, when multicast router 112 receives an unsolicited V2 membership report from multicast line card 126B (on the second router interface) that identifies the multicast group address of channel 4, multicast router 112 associates the multicast group address of channel 4 with the second router interface in the forwarding table when the multicast group address of channel 4 is not associated with the second router interface. Thus, although the forwarding table may forward the same packets to the first and second router interfaces, the first and second interfaces of multicast router 112 are unrelated.

When multicast router 112 receives a leave message from a host (proxy) 116 on a router output interface, and the message includes a multicast group address of a group (television channel) that is not currently output to any other host (proxy) 116 connected to the router output interface, multicast router 112 de-associates the multicast group address of the group (television channel) from the router output interface in the forwarding table.

For example, when multicast router 112 receives a leave message from multicast line card 126A (on the first router interface) that identifies the multicast group address of channel 4, multicast router 112 de-associates the multicast group address of channel 4 from the first router interface in the forwarding table when the multicast group address of channel 4 is not output to any other host (proxy) 116 associated with the first router interface.

Similarly, when multicast router 112 receives a leave message from multicast line card 126B (on the second router interface) that identifies the multicast group address of channel 4, multicast router 112 de-associates the multicast group address of channel 4 from the second router interface in the forwarding table when the multicast group address of channel 4 is not output to any other host (proxy) 116 associated with the first router interface.

Figure 4:
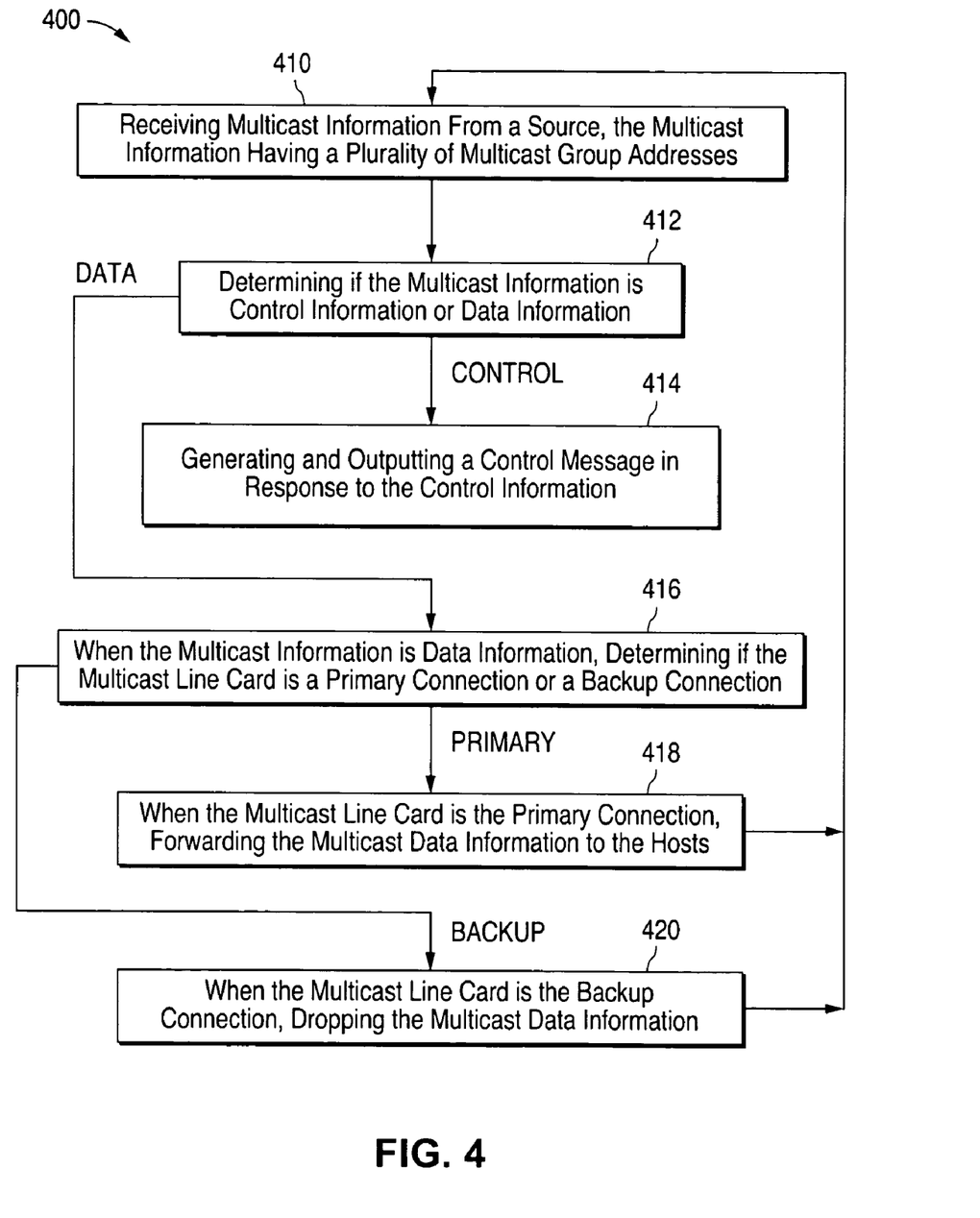
FIG. 4 is a flow chart illustrating an example of a method 400 of operating a multicast line card 126 of IGMP proxy 116 in accordance with the present invention.

FIG. 4 shows a flow chart that illustrates an example of a method 400 of operating a multicast line card 126 of IGMP proxy 116 in accordance with the present invention. Method 400 can be implemented, for example, in an application specific integrated circuit (ASIC). As shown in FIG. 4, method 400 begins at step 410 by receiving multicast information from a source, such as a router, where the multicast information can have a plurality of multicast group addresses.

For example, multicast line card 126A can receive multicast information from multicast router 112. The multicast information, in turn, can include data information, such as television channels with different multicast group addresses, or control information, such as general or specific queries.

When method 400 detects the receipt of multicast information, method 400 moves to step 412 to determine if the multicast information is data information or control information. When the multicast information is control information, such as a general or a specific query, method 400 moves to step 414 to generate and output a control message to PCM 130 in response to the control information.

For example, when multicast control information is received by multicast line card 126B, multicast line card 126B generates and outputs a control message to PCM 130 that includes the control information. In response to the control information (regarding the query), PCM 130 generates a query response that indicates the multicast group addresses that are received by multicast line card 126B. Following this, PCM card 130 transmits the query response to multicast line card 126B which, in turn, outputs the query response to multicast router 112.

On the other hand, when the multicast information is data information, method 400 moves to step 416 to determine if the multicast line card 126 is a primary connection or a backup connection. For example, multicast line card 126A can be designated to be the primary connection, while multicast line card 126B can be designated to be the backup connection.

When the multicast data information is received on the primary connection, method 400 moves to step 418 to forward the multicast data information to the hosts as indicated by the forwarding table for the multicast line card 126. For example, when multicast line card 126A is the primary connection and multicast data information is received by multicast line card 126A, multicast line card 126A forwards the data information to the host line cards 122 as indicated by the forwarding table for multicast line card 126A.

On the other hand, when method 400 determines in step 416 that the multicast data information was received by the backup connection, method 400 moves to step 420 to drop the multicast data information received by the backup connection, and return to step 410. For example, when multicast line card 126A is the primary connection, multicast line card 126B is the backup connection, and the multicast data information is received by multicast line card 126B, method 400 drops the multicast data information.

In addition to method 400, the multicast line cards 126 also determine whether a link between the line card 126 and a forwarding unit, such as a multicast router, has failed. PCM 130 can then utilize the link status to determine which multicast line card 126 is designated as the primary connection and the backup connection.

Link failure can be detected in a number of ways, including changes in the physical characteristics of the line that connects, for example, multicast router 112 to multicast line card 126A. In addition, the lack of packet flow can be used to detect non-physical failures between, for example, multicast router 112 and multicast line card 126A.

Figure 5:
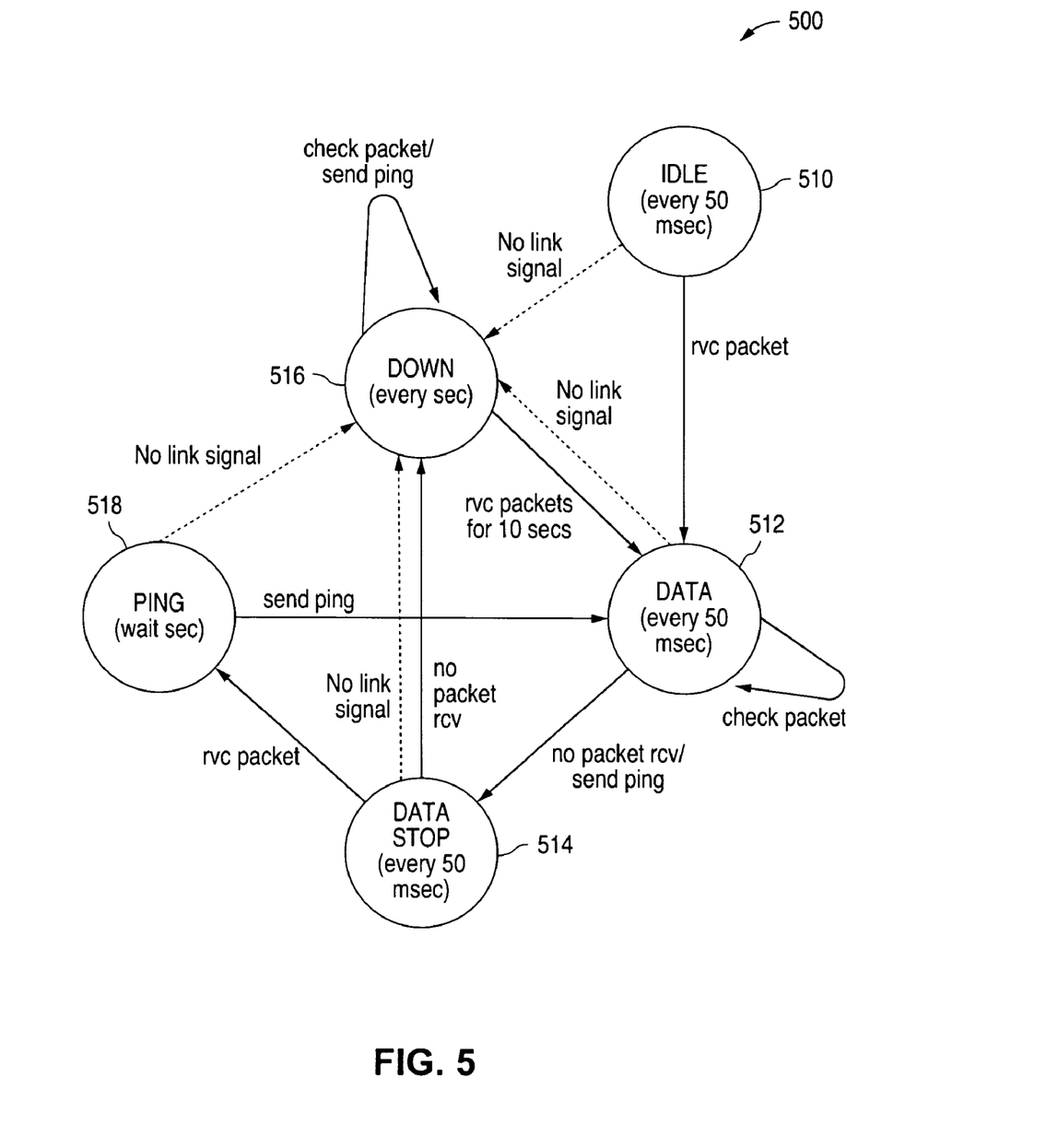
FIG. 5 is a state diagram illustrating an example of a method 500 of determining whether a link (electrical or physical) between a multicast line card and a forwarding unit, such as a router, has failed in accordance with the present invention.

FIG. 5 shows a state diagram that illustrates an example of a method 500 of determining whether a link (electrical or physical) between a multicast line card and a forwarding unit, such as a router, has failed in accordance with the present invention. Method 500 can be implemented in an application specific integrated circuit (ASIC) on, for example, a multicast line card 126.

As shown in FIG. 5, method 500 begins in an idle state 510, and moves to a data state 512 when a packet is received, such as from multicast router 112. When in data state 512, method 500 checks the statistics of the received packets every, for example, 50 mS. During normal operation, method 500 remains in data state 512, periodically checking the statistics of the received packets.

When no packet has been received for a predefined time, method 500 outputs a ping to the forwarding unit, such as multicast router 112, and moves to data stop state 514. If a packet that responds to the ping is not received from the forwarding unit within a time period of, for example, 50 mS, method 500 moves to a down state 516.

In down state 516, method 500 sends a ping to the forwarding unit, such as multicast router 112, every, for example, one second, and only transitions back to data state 512 after, for example, ten consecutive packets have been received from the forwarding unit in response to ten corresponding pings.

In addition, method 500 also notifies PCM card 130 that the link has failed. In response, PCM card 130 outputs control messages to the primary and backup connections, e.g., multicast line cards 126A and 126B, to switch designations so that the backup connection is now the primary connection, and the primary connection is now the backup connection. Thus, as soon as any link failure is detected, network 200 can be restored with minimal interruption to the multicast data received by the hosts (end users).

On the other hand, if a packet that responds to the ping is received within the time period, method 500 moves to ping state 518, waits a predetermined time, such as one second, and then outputs a second ping and returns to data state 512. Thus, when no traffic is present, method 500 periodically pings the forwarding unit. As a result, when an electrical link between a forwarding unit and a multicast line card has failed, such as when the electrical link between multicast router 112 and multicast line card 126A has failed, the condition is detected almost immediately.

When a physical link between the forwarding unit and the multicast line card has failed, such as when the link between multicast router 112 and multicast line card 126A has failed, the condition can be detected in any state. In this case, method 500 immediately moves to down state 516 (as shown by the dashed lines), where the link failure is reported to PCM card 130.

One of the advantages of the present invention is that the present invention provides network redundancy that prevents a severed or damaged line, or a malfunctioning router output interface from denying services to an IGMP proxy. In the present invention, when multicast line card 126A is the primary connection and multicast line card 126B is the backup connection, if anything happens to the connection between multicast router 112 and multicast line card 126A, the condition is detected immediately and multicast line card 126B is substituted with substantially no loss of service to the hosts (end users) 114.

It should be understood that the above descriptions are examples of the present invention, and that various alternatives of the invention described herein may be employed in practicing the invention. Thus, it is intended that the following claims define the scope of the invention and that structures and methods within the scope of these claims and their equivalents be covered thereby.

What is claimed is:

1. A method of operating a communications network, the method comprising:
    receiving a control message, the control message including a user request that a multicast data stream be sent to an end user, the multicast data stream being identified by a multicast group address;
    determining if the multicast data stream is being received from a router; and
    when the multicast data stream is not being received from the router, a link connected to a first line card is operational, and a link connected to a second line card is operational, outputting a message to the first line card instructing the first line card to output the user request to a first interface of the router, and a message to the second line card instructing the second line card to output the user request to a second interface of the router.

2. The method of claim 1 and further comprising assigning one line card of the first line card and the second line card to be a primary line card, and one line card of the first line card and the second line card to be a backup line card.

3. The method of claim 1 and further comprising receiving a control message that includes a leave request to stop sending the multicast data stream to the end user.

4. The method of claim 3 and further comprising outputting a message to the first line card instructing the first line card to output the leave request to the first interface of the router, and a message to the second line card instructing the second line card to output the leave request to the second interface of the router when the end user is a last end user to stop receiving the multicast data stream.

5. A method of operating a communications network, the method comprising:
    receiving first membership information from a host via a host interface of a plurality of electrically-connected host and multicast interfaces, the first membership information identifying a multicast group address of a multicast data stream;
    determining if the multicast data stream having the multicast group address is output to another host interface of the plurality of electrically-connected host and multicast interfaces;
    when the multicast data stream having the multicast group address is not output to another host interface of the plurality of electrically-connected host and multicast interfaces, generating second membership information that identifies the multicast group address of the multicast data stream;
    outputting the second membership information to a first multicast interface, the first multicast interface to output a membership message in response to the second membership information, a first interface of a forwarding unit to be connected to receive the membership message output by the first multicast interface; and
    outputting the second membership information to a second multicast interface.

6. The method of claim 5 wherein the second multicast interface outputs a membership message, and a second interface of the forwarding unit is connected to receive the membership message output by the second multicast interface.

7. The method of claim 6 wherein the first and second interfaces of the forwarding unit are unrelated.

8. A method of operating a communications network, the method comprising:
    receiving a command with a line card, the command being output by a controller, and directing the line card to obtain data information from a source, the controller being unconnected to the source;
    transmitting a request from the line card to the source to obtain the data information in response to the command;
    receiving multicast information with the line card that transmitted the request, the multicast information being output by the source in response to the request;
    determining if the multicast information received by the line card that sent the request is control information or data information; and
    when determined to be data information, dropping the data information when the line card that sent the request is designated to be a backup line card.

9. The method of claim 8 and further comprising, when determined to be data information, forwarding the data information when designated to be a primary line card.

10. The method of claim 9 and further comprising, when determined to be control information, generating and outputting a control message in response to the control information.

11. The method of claim 10 wherein the control message is output to the controller.

12. The method of claim 11 and further comprising determining whether a link to a forwarding unit has failed.

13. The method of claim 9 and further comprising receiving a message from the controller that designates primary or backup status.

14. A method of operating a communications network, the method comprising:
- receiving multicast information from a source, the multicast information from the source having a plurality of multicast group addresses;
- determining if the multicast information from the source is control information or data information;
- generating and outputting a control message in response to control information;
- determining if the multicast information from the source was received by a primary connection or a backup connection when the multicast information from the source is data information;
- forwarding the multicast information from the source when the multicast information from the source is data information and the multicast information from the source was received by the primary connection;
- dropping the multicast information from the source when the multicast information from the source is data information, and the multicast information from the source was received by the backup connection; and
- determining whether a link between the primary connection and a forwarding unit has failed, the determining whether the link has failed includes:
  - moving from a first state to a second state when a packet is received;
  - when a packet has not been received for a period of time, moving from the second state to a third state and outputting a ping to the forwarding unit; and
  - when a response to the ping has not been received for a predefined time, moving to a fourth state to output a link down signal.

15. The method of claim 14 and further comprising:
- when a response to the ping has been received during the predefined time, moving to a fifth state; and
- waiting a time period in the fifth state, outputting another ping to the forwarding unit, and moving to the second state.

16. The method of claim 14 and further comprising switching the backup connection to be the primary connection, and the primary connection to be the backup connection when the link down signal indicates that the link has failed.

17. A control line card comprising:
a memory; and
a control device connected to the memory, the control device to:
- receive a control message from a host line card, the control message including a user request that a multicast data stream be sent to an end user, the multicast data stream being identified by a multicast group address;
- determine if the multicast data stream is being received from a router; and
- when the multicast data stream is not being received from the router, a link connected to a first line card is operational, and a link connected a second line card is operational, output a message to the first line card instructing the first line card to output the user request to a first interface of the router, and a message to the second line card instructing the second line card to output the user request to a second interface of the router.

18. The control line card of claim 17 wherein the memory includes:
- a first table to identify multicast groups that are received by the host line card; and
- a second table to identify multicast groups that are received by the first line card.

19. The control line card of claim 17 wherein the control device assigns one line card of the first line card and the second line card to be a primary line card, and one line card of the first line card and the second line card to be a backup line card.

20. A control line card comprising:
a memory; and
a control device connected to the memory, the control device to:
- receive a command with a line card, the command being output by a controller, and directing the line card to obtain data information from a source, the controller being unconnected to the source;
- transmit a request from the line card to the source to obtain the data information in response to the command;
- receive multicast information with the line card that transmitted the request, the multicast information being output by the source in response to the request;
- determine if the multicast information received by the line card that sent the request is control information or data information; and
- when determined to be data information, drop the data information when the line card that sent the request is designated to be a backup line card.

21. The control line card of claim 20 and further comprising, when determined to be data information, forwarding the data information when designated to be a primary line card.

22. The control line card of claim 21 and further comprising, when determined to be control information, generating and outputting a control message to the controller in response to the control information.

* * * * *